(12) United States Patent
West et al.

(10) Patent No.: US 9,595,905 B2
(45) Date of Patent: Mar. 14, 2017

(54) REFRIGERANT COMPRESSOR DRIVES OFFERING ENHANCED ROBUSTNESS, EFFICIENCY AND RATED VOLTAGE OPERABILITY

(71) Applicant: Trane International Inc., Piscataway, NJ (US)

(72) Inventors: Nathan Thomas West, Holmen, WI (US); Dennis Myron Beekman, LaCrosse, WI (US); David Marshall Foye, LaCrosse, WI (US)

(73) Assignee: Trane International Inc., Piscataway, NJ (US)

( * ) Notice: Subject to any disclaimer, the term of this patent is extended or adjusted under 35 U.S.C. 154(b) by 0 days.

(21) Appl. No.: 14/800,440

(22) Filed: Jul. 15, 2015

(65) Prior Publication Data
US 2015/0318813 A1    Nov. 5, 2015

Related U.S. Application Data

(63) Continuation of application No. PCT/US2014/012289, filed on Jan. 21, 2014.
(Continued)

(51) Int. Cl.
*H02P 21/00* (2016.01)
*H02P 27/04* (2016.01)
(Continued)

(52) U.S. Cl.
CPC .......... *H02P 27/047* (2013.01); *F04B 35/04* (2013.01); *F04B 49/06* (2013.01); *F25B 31/02* (2013.01);
(Continued)

(58) Field of Classification Search
CPC ........................ H02P 21/0035; Y02T 10/643
(Continued)

(56) References Cited

U.S. PATENT DOCUMENTS 7,534,096 B2    5/2009   Schulz
7,859,207 B2 *  12/2010  Yamada .................. H02P 21/34
                                                      318/400.02
(Continued)

OTHER PUBLICATIONS

Korean Patent Office, International Search Report and Written Opinion, PCT/US2014/012289, Trane International Inc., Apr. 29, 2014, 11 pgs.

*Primary Examiner* — Rina Duda
(74) *Attorney, Agent, or Firm* — Taft Stettinius & Hollister LLP

(57) ABSTRACT

Apparatuses, methods, and systems offering enhanced robustness, efficiency and rated voltage operability for refrigerant compressor drives are disclosed. An exemplary embodiment is a method of operating a variable frequency drive. The method includes operating the drive over a first operating range to provide at least a desired operating speed and minimize d-axis current, operating the drive over a second operating range including injecting d-axis current to provide at least the desired operating speed, operating the drive over a third operating range at a de-rated speed less than the desired operating speed. In the first operating range the drive input voltage is greater than a first value. In the second operating range the drive input voltage is lower than the first value and greater than a second value. In the third operating range the drive input voltage is lower than the second value.

21 Claims, 5 Drawing Sheets

Related U.S. Application Data

(60) Provisional application No. 61/754,719, filed on Jan. 21, 2013.

(51) Int. Cl.
  *F25B 31/02* (2006.01)
  *F04B 35/04* (2006.01)
  *F04B 49/06* (2006.01)

(52) U.S. Cl.
  CPC ........ *H02P 6/28* (2016.02); *F04B 2203/0202* (2013.01); *F04B 2203/0209* (2013.01)

(58) Field of Classification Search
  USPC .................................. 318/400.02, 800, 801
  See application file for complete search history.

(56) References Cited

U.S. PATENT DOCUMENTS

| | | |
|---|---|---|
| 8,336,323 B2 | 12/2012 | Borisov et al. |
| 8,353,174 B1 | 1/2013 | Jadric et al. |
| 2005/0189904 A1 | 9/2005 | Wills et al. |
| 2007/0063668 A1 | 3/2007 | Schnetzka et al. |
| 2009/0315492 A1* | 12/2009 | Oomura .................... H02P 6/20 318/400.02 |
| 2011/0031920 A1* | 2/2011 | Henderson .......... H02P 21/0089 318/434 |
| 2012/0191253 A1 | 7/2012 | Rockenfeller et al. |

\* cited by examiner

REFRIGERANT COMPRESSOR DRIVES OFFERING ENHANCED ROBUSTNESS, EFFICIENCY AND RATED VOLTAGE OPERABILITY

BACKGROUND

Variable frequency motor drives offer a number of potential benefits for applications such as driving compressors or other loads for heating, ventilation, air-conditioning, or refrigeration (HVACR) systems, including potential for enhanced efficiency, power density, and speed control precision. Such motor drives also present unique challenges with respect to robustness, service life, and tolerance to rated voltages including low input line voltages within a rated range. Heretofore, HVACR drive and motor designs have faced a number of undesirable trade-offs. For example, in selecting DC bus capacitor components there are competing needs for service life and robustness, and sufficient capacitance to meet voltage ripple and harmonic feedback mitigation goals. Traditionally, electrolytic capacitors have been utilized in the DC bus to provide the desired level of capacitance, however, their limited service life relative to the lifespan of HVACR systems has long been a source of frustration for designers and consumers. Some recent designs have utilized film capacitors which offer significantly enhanced lifespan compared to electrolytic capacitors; however, this benefit comes at a cost of lower capacitance relative to electrolytic capacitors.

The aforementioned trade-offs are compounded by the need to account for rated input line voltage phenomena. Utility power lines and other power sources have a rated voltage range which is sometimes expressed as a nominal rated voltage with the range being implicit. Power electronics and motor drive systems coupled to such power sources must be configured to meet desired performance criteria over the full rated input voltage range, including the low voltage portion of the rated range, as is expected that such voltages will be encountered in normal real world operation. This presents a unique challenge to HVACR compressor drives which must be designed to maintain a desired speed to attain desired performance and efficiency. Lower capacitance drives produce lower output voltages and are more susceptible to performance variation from input voltage variation. This in turn forces system designs toward motors with lower electrical constants which require greater current to achieve functional requirements. This increases the expense both of the system itself and of operating the system. Increased current also increases losses through resistive heating which further compromises operational efficiency. Conventional attempts to address these and other challenges suffer from a number of shortcomings. There is a need for the unique and inventive apparatuses, methods and systems disclosed herein.

DISCLOSURE

For the purposes clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall be understood that no limitation of the scope of the invention is thereby created, and that the invention includes and protects such alterations, modifications, and further applications of the exemplary embodiments as would occur to one skilled in the art to which the invention relates.

SUMMARY

Unique refrigerant compressor drive apparatuses, methods, and systems offering enhanced robustness, efficiency and rated voltage operability are disclosed. One exemplary embodiment is a method of operating a variable frequency drive. The method includes operating the drive over a first operating range to provide at least a desired operating speed and minimize d-axis current, and operating the drive over a second operating range including increasing d-axis current to provide at least the desired operating speed. In the first operating range the drive input voltage is greater than a first value. In the second operating range the drive input voltage is lower than the first value and greater than a second value. Some embodiments further include operating the drive over a third operating range at a de-rated speed less than the desired operating speed. In the third operating range the drive input voltage is lower than the second value. Further embodiments, forms, objects, features, advantages, aspects, and benefits shall become apparent from the following description and drawings.

DETAILED DESCRIPTION

Figure 1:
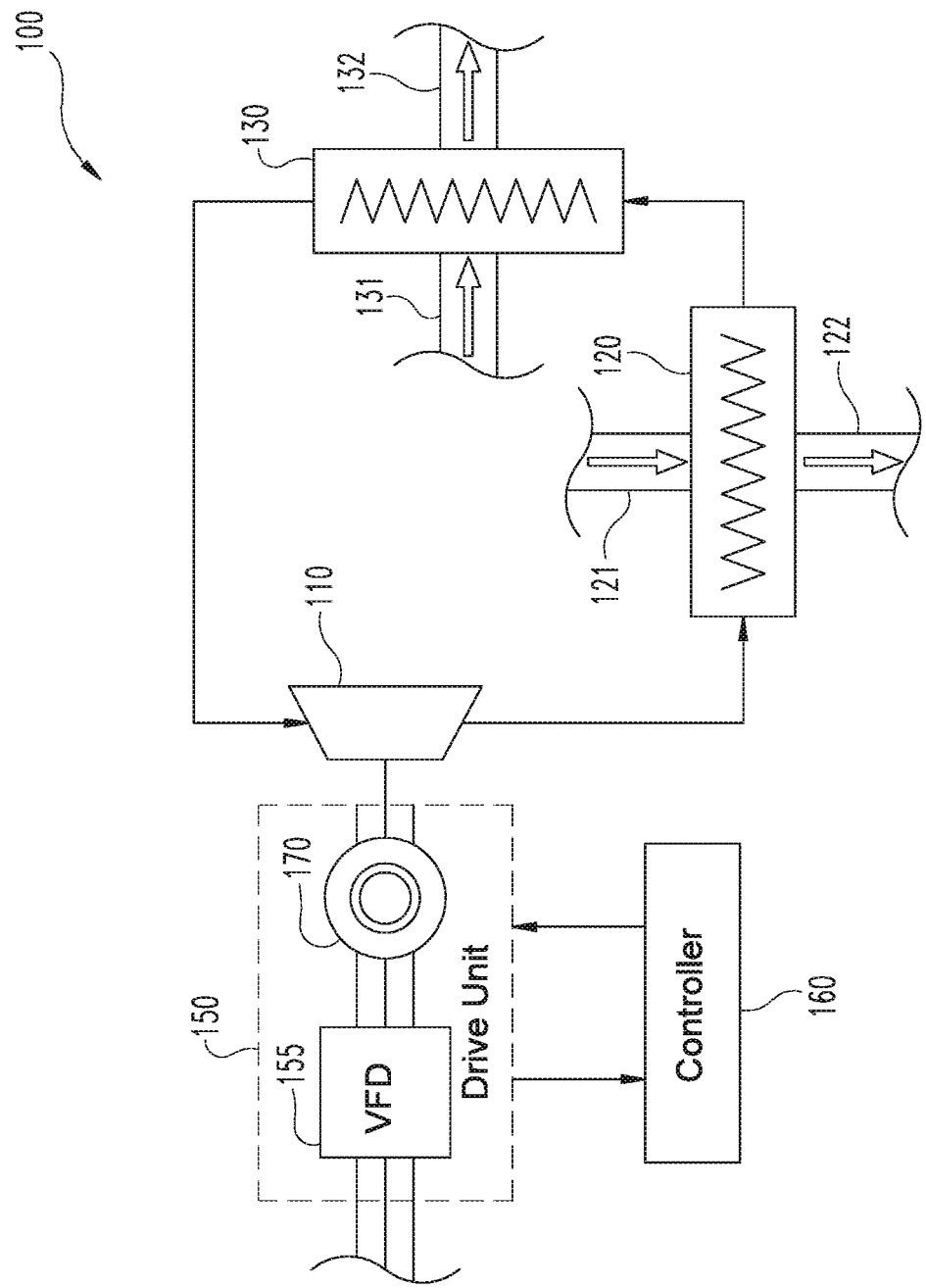
FIG. 1 is a schematic illustration of an exemplary HVACR system.

With reference to FIG. 1 there is illustrated an exemplary HVACR system 100 which includes a refrigerant loop comprising a compressor 110, a condenser 120, and an evaporator 130. Refrigerant flows through system 100 in a closed loop from compressor 110 to condenser 120 to evaporator 130 and back to compressor 110. Various embodiments may also include additional refrigerant loop elements including, for example, valves for controlling refrigerant flow, refrigerant filters, economizers, oil separators and/or cooling components and flow paths for various system components.

Compressor 110 is driven by a drive unit 150 including a permanent magnet electric motor 170 which is driven by a variable frequency drive 155. In the illustrated embodiment, variable frequency drive 155 is configured to output a three-phase PWM drive signal, and motor 170 is a surface magnet permanent magnet motor. Use of other types and configurations of variable frequency drives and electric motors such as interior magnet permanent magnet motors, reluctance motors, or inductance motors are also contemplated. It shall be appreciated that the principles and techniques disclosed herein may be applied to a broad variety of drive and permanent magnet motor configurations.

Condenser 120 is configured to transfer heat from compressed refrigerant received from compressor 110. In the illustrated embodiment condenser 120 is a water cooled condenser which receives cooling water at an inlet 121, transfers heat from the refrigerant to the cooling water, and outputs cooling water at an output 122. It is also contemplated that other types of condensers may be utilized, for example, air cooled condensers or evaporative condensers. It shall further be appreciated that references herein to water include water solutions comprising additional constituents unless otherwise limited.

Evaporator 130 is configured to receive refrigerant from condenser 120, expand the received refrigerant to decrease its temperature and transfer heat from a cooled medium to the refrigerant. In the illustrated embodiment evaporator 130 is configured as a water chiller which receives water provided to an inlet 131, transfers heat from the water to the refrigerant, and outputs chilled water at an outlet 132. It is contemplated that a number of particular types of evaporators may be utilized, including dry expansion evaporators, flooded type evaporators, bare tube evaporators, plate surface evaporators, and finned evaporators among others.

HVACR system 100 further includes a controller 160 which outputs control signals to variable frequency drive 155 to control operation of the motor 170 and compressor 110. Controller 160 also receives information about the operation of drive unit 150. In exemplary embodiments controller 160 receives information relating to motor current, motor terminal voltage, and/or other operational characteristics of the motor. It shall be appreciated that the controls, control routines, and control modules described herein may be implemented using hardware, software, firmware and various combinations thereof and may utilize executable instructions stored in a non-transitory computer readable medium or multiple non-transitory computer readable media. It shall further be understood that controller 160 may be provided in various forms and may include a number of hardware and software modules and components such as those disclosed herein.

Figure 2:
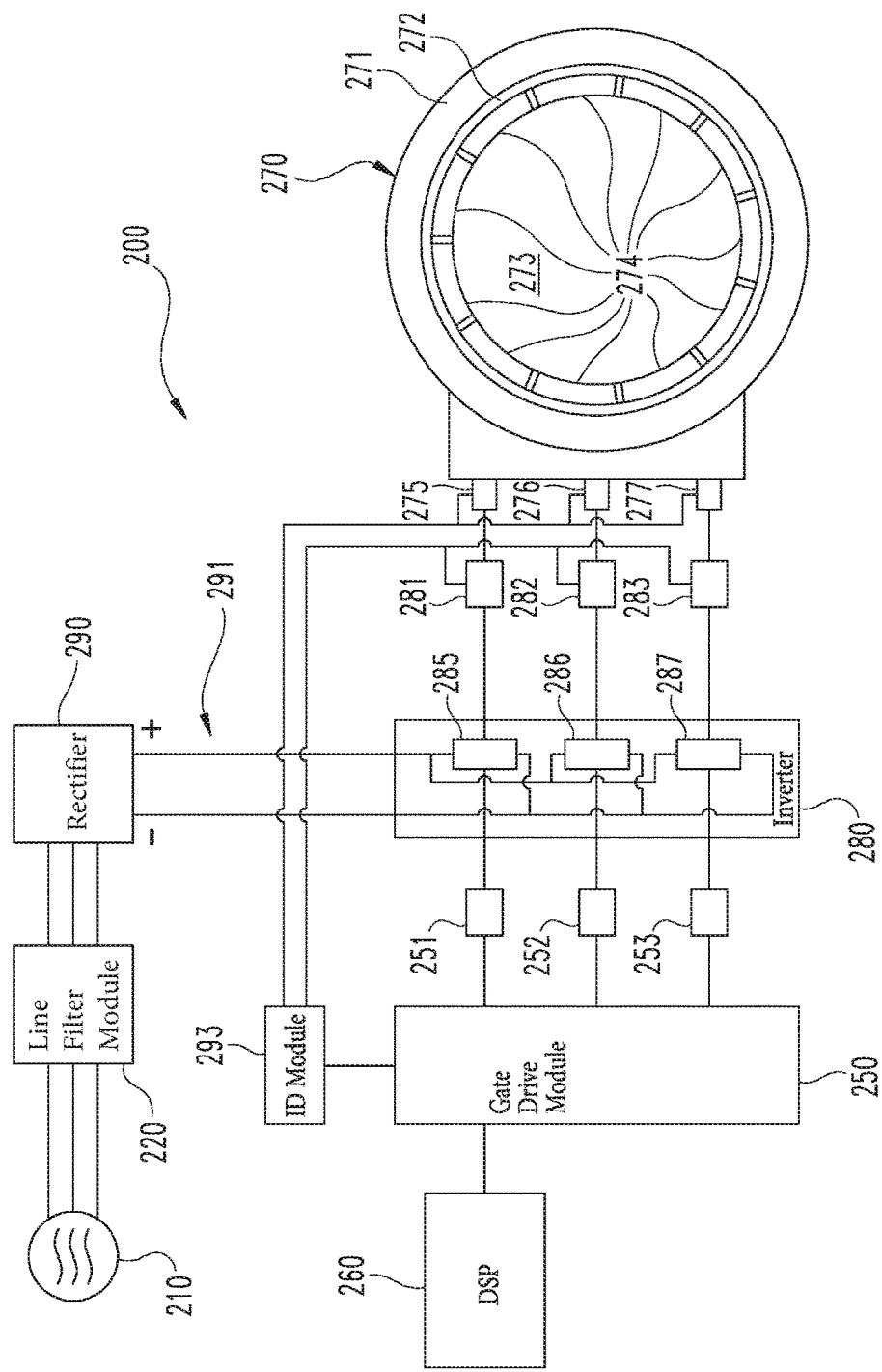
FIG. 2 is a schematic illustration of an exemplary variable frequency drive and permanent magnet motor.

With reference to FIG. 2 there is illustrated an exemplary circuit diagram for a variable frequency motor drive 200. Drive 200 is connected to a power source 210, for example, a 400/480 VAC utility power supply which provides three-phase AC power to line filter module 220. Line filter module 220 is configured to provide harmonic damping to mitigate losses which can arise from harmonic feedback from drive components to power source 210. Line filter module 220 outputs three-phase AC power to a rectifier 290 which converts the AC power to DC power and provides the DC power to a DC bus 291. DC bus 291 is preferably a film capacitor-cased bus which includes one or more film capacitors electrically coupled between positive and negative bus rails. DC bus 291 is connected to inverter 280. For clarity of illustration and description, rectifier 290, DC bus 291, and inverter 280 are shown as discrete elements. It shall be appreciated, however, that two or more of these components may be provided in a common module, board or board assembly which may also include a variety of additional circuitry and components. It shall be further understood that, in addition to the illustrated 6-pulse rectifier, other multiple pulse rectifiers such as 12-pulse, 18-pulse, 24-pulse or 30-pulse rectifiers may be utilized along with phase shifting transformers providing appropriate phase inputs for 6-pulse 12-pulse, 18-pulse, 24-pulse, or 30-pulse operation.

Inverter module 280 includes switches 285, 286 and 287 which are connected to the positive and negative rails of DC bus 291. Switches 285, 286 and 287 are preferably configured as IGBT and diode based switches, but may also utilize other types of power electronics switching components such as power MOSFETs or other electrical switching devices. Switches 285, 286 and 287 provide output to motor terminals 275, 276 and 277. Current sensors 281, 282 and 283 are configured to detect current flowing from inverter module 280 to motor 270 and send current information to ID module 293. Voltage sensors are also operatively coupled with motor terminals 275, 276 and 277 and configured to provide voltage information from the motor terminals to ID module 293.

ID module 293 includes burden resistors used in connection with current sensing to set the scaling on current signals ultimately provided to analog to digital converters for further processing. ID module 293 tells the VFD what size it is (i.e. what type of scaling to use on current post ADC) using identification bits which are set in hardware on the ID module 293. ID module 293 also outputs current and voltage information to gate drive module 250 and also provides identification information to gate drive module 250 which identifies the type and size of the load to which gate drive module 250 is connected. ID module 293 may also provide current sensing power supply status information to gate drive module 250. ID module 293 may also provide scaling functionality for other parameters such as voltage or flux signals in other embodiments.

Gate drive module 250 provides sensed current and voltage information to analog to digital converter inputs of DSP module 260. DSP module 260 processes the sensed current and voltage information and also provides control signals to gate drive module 250 which control signals gate drive module 250 to output voltages to boost modules 251, 252 and 253, which in turn output boosted voltages to switches 285, 286 and 287. The signals provided to switches 285, 286 and 287 in turn control the output provided to terminals 275, 276 and 277 of motor 270.

Motor 270 includes a stator 271, a rotor 273, and an air gap 272 between the rotor and the stator. Motor terminals 275, 276 and 277 are connected to windings provided in stator 271. Rotor 273 includes a plurality of permanent magnets 274. In the illustrated embodiment magnets 274 are configured as surface permanent magnets positioned about the circumference of rotor 273. The rotor is typically constructed using the permanent magnets in such a way as essentially a constant magnetic flux is present at the surface of the rotor. In operation with rotation of the rotor, the electrical conductors forming the windings in the stator are disposed to produce a sinusoidal flux linkage. Other embodiments also contemplate the use of other magnet configurations such as interior magnet configurations as well as inductance motor configurations, reluctance motor configurations and other non-permanent magnet configurations.

Figure 3:
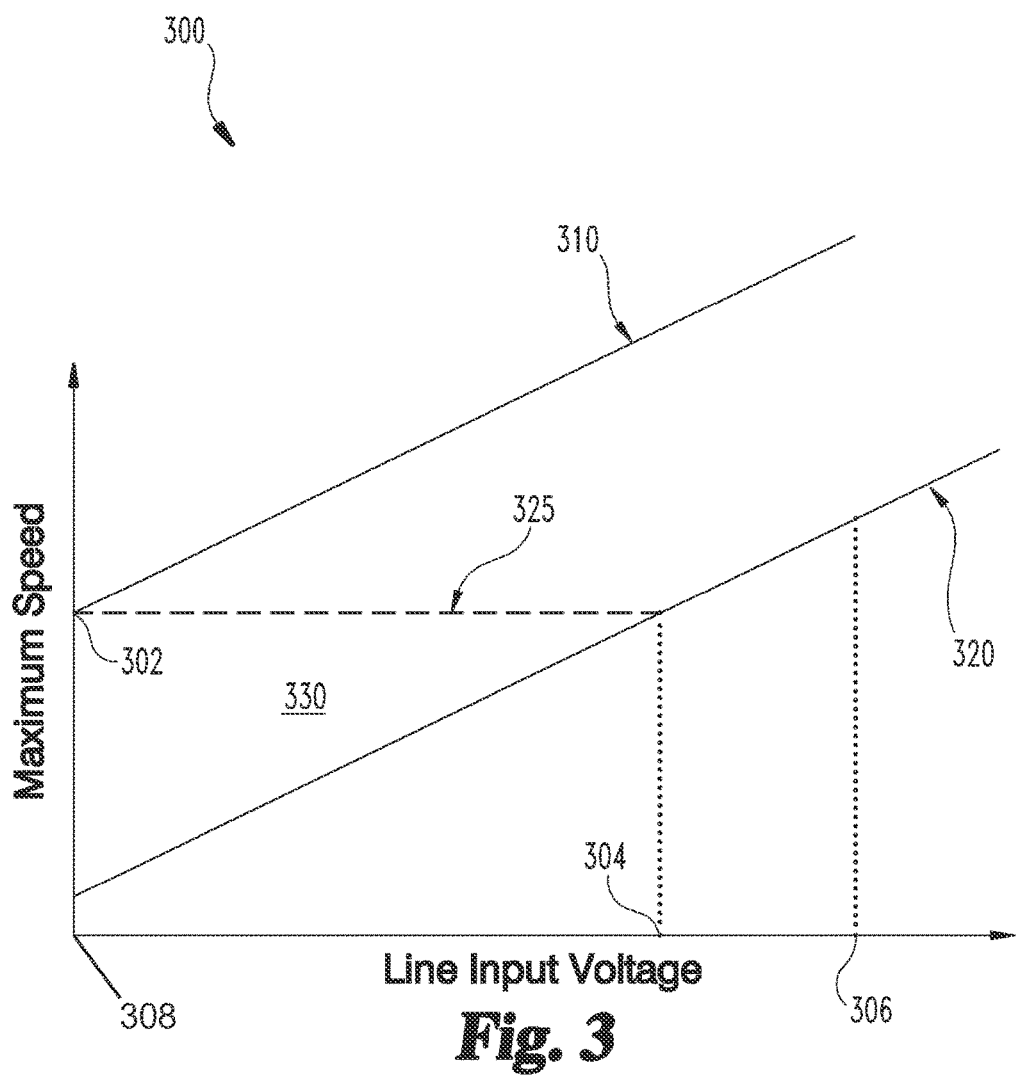
FIG. 3 is a diagram illustrating characteristics of exemplary low input voltage compatible designs.

With reference to FIG. 3 there is illustrated a graph 300 of maximum motor or compressor speed as a function of variable frequency drive line input voltage. Line 310 illustrates a substantially linear relationship between line input voltage and maximum speed for a motor design with a low motor back EMF constant (Kemf). Line 320 illustrates a substantially linear relationship between maximum speed and line input voltage for a motor design with a high Kemf. It shall be appreciated that the terms high and low in this context are relative and that the particular motor Kemf values will vary depending upon the needs and characteristics of a particular implementation.

Graph 300 further illustrates a required speed 302 which is a system design parameter corresponding to the motor or compressor speed that an HVACR system requires to meet defined or desired performance and/or efficiency goals. For a motor conforming to the characteristics of line 310, required speed 302 can be achieved at a defined minimum line input voltage 308 which is within the rated voltage range of the input line while simultaneously minimizing d-axis current as is indicated by the vertical axis intercept of line 310. It shall be appreciated that minimization of d-axis current need not be absolute and may include d-axis current values which are substantially minimized while still including a some d-axis current, as well as d-axis current values that approach, approximate, or target an ideal or theoretical minimization value. For a motor conforming to the characteristics of line 320, speed 302 cannot be achieved below threshold voltage 304 while simultaneously minimizing d-axis current. Thus, d-axis current injection may be utilized in region 330 to de-flux the motor or reduce motor back EMF to achieve the required speed 302 as is indicated by line 325. The degree of d-axis current injection along line 325 is generally a function of the magnitude of the required speed and the distance from line 325 to line 320 over the range from voltage 308 to voltage 304.

Graph 300 further illustrates line input voltage 306 which is the nominal input line voltage at which a motor conforming to the characteristics of line 320 will operate at full torque under nominal input line voltage conditions. Such a motor will continue to operate at full torque at reduced input line voltages as low as voltage 304. Below voltage 304 and down to voltage 308, such a motor will operate at reduced torque while maintaining meeting or exceeding required speed 302. Below voltage 308 such a motor will continue to operate but at a speed lower than required speed 302. It shall be appreciated that the motor may be configured such that voltage 306 corresponds to the nominal rating of an input line source, the range between voltages 304 and 306 includes the most commonly experienced voltage variations from the nominal rating, for example, a +/− range expressly or implicitly present in the nominal rating, and that the range between voltages 304 and 308 includes lower commonly encountered voltages, for example, voltages falling outside a +/− range but which are still encountered in real world operation.

Figure 4:
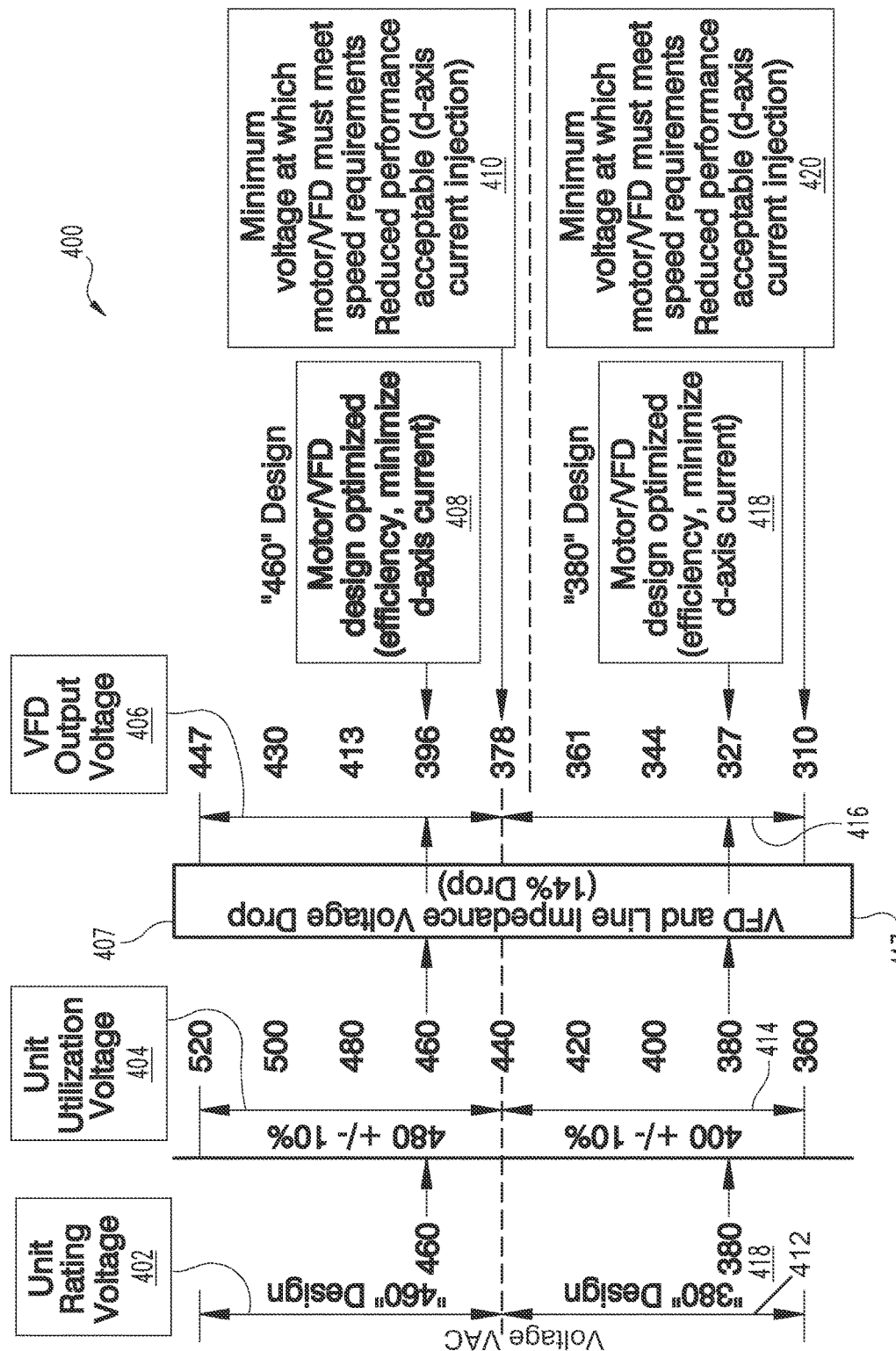
FIG. 4 is a graph illustrating motor design characteristics.

With reference to FIG. 4 there is illustrated a diagram 400 of two exemplary design optimizations for a variable frequency drive and motor system. In the 460 V design shown in the upper portion of FIG. 4, unit rating voltage 402 is the rated range of the voltage provided by the input line which powers the drive and extends from approximately 440 V to 520 V or 480 V +/−10%. Unit utilization voltage 404 is the rated range of voltages that the design is configured to use as an input. In the illustrated embodiment unit utilization voltage 404 also extends from approximately 440 V to 520 V or 480 V +/−10%, however, it shall be appreciated the range could vary in other embodiments. VFD output voltage 406 is the output voltage range that can be provided by the variable frequency drive. VFD output voltage 406 ranges from approximately 447 V to 378 V due to variable frequency drive and line impedance 407 which cause a voltage drop (in this embodiment approximately 14%, though the value may vary in other embodiments) relative to the unit utilization voltage 404. The 460 V design is optimized to a 460 V line input voltage and 396 V drive output voltage as indicated by optimized output voltage 408. Accordingly efficiency is maximized and d-axis current is minimized at these voltages. Voltage 410 is the minimum voltage at which the drive and motor system must meet speed requirements while permitting reduced performance attributable to d-axis current injection.

In the 360 V design shown in the lower portion of FIG. 4, unit rating voltage 412 is the rated range of the voltage provided by the input line which powers the drive and extends from approximately 360 V to 440 V or 400 V +/− 10%. Unit utilization voltage 414 is the rated range of voltages that the design is configured to use as an input. In the illustrated embodiment unit utilization voltage 414 also extends from approximately 360 V to 440 V or 400 V +/−10%, however, it shall be appreciated the range could vary in other embodiments. VFD output voltage 416 is the output voltage range that can be provided by the variable frequency drive. VFD output voltage 406 ranges from approximately 378 V to 310 V due to variable frequency drive and line impedance 417 which cause a voltage drop (in this embodiment approximately 14% though the value may vary in other embodiments) relative to the unit utilization voltage 404. The 380 V design is optimized to a 380 V line input voltage and 327 V drive output voltage as indicated by optimized output voltage 418. Accordingly efficiency is maximized and d-axis current is minimized at these voltages. Voltage 420 is the minimum voltage at which the drive and motor system must meet speed requirements while permitting reduced performance attributable to d-axis current injection.

Figure 5:
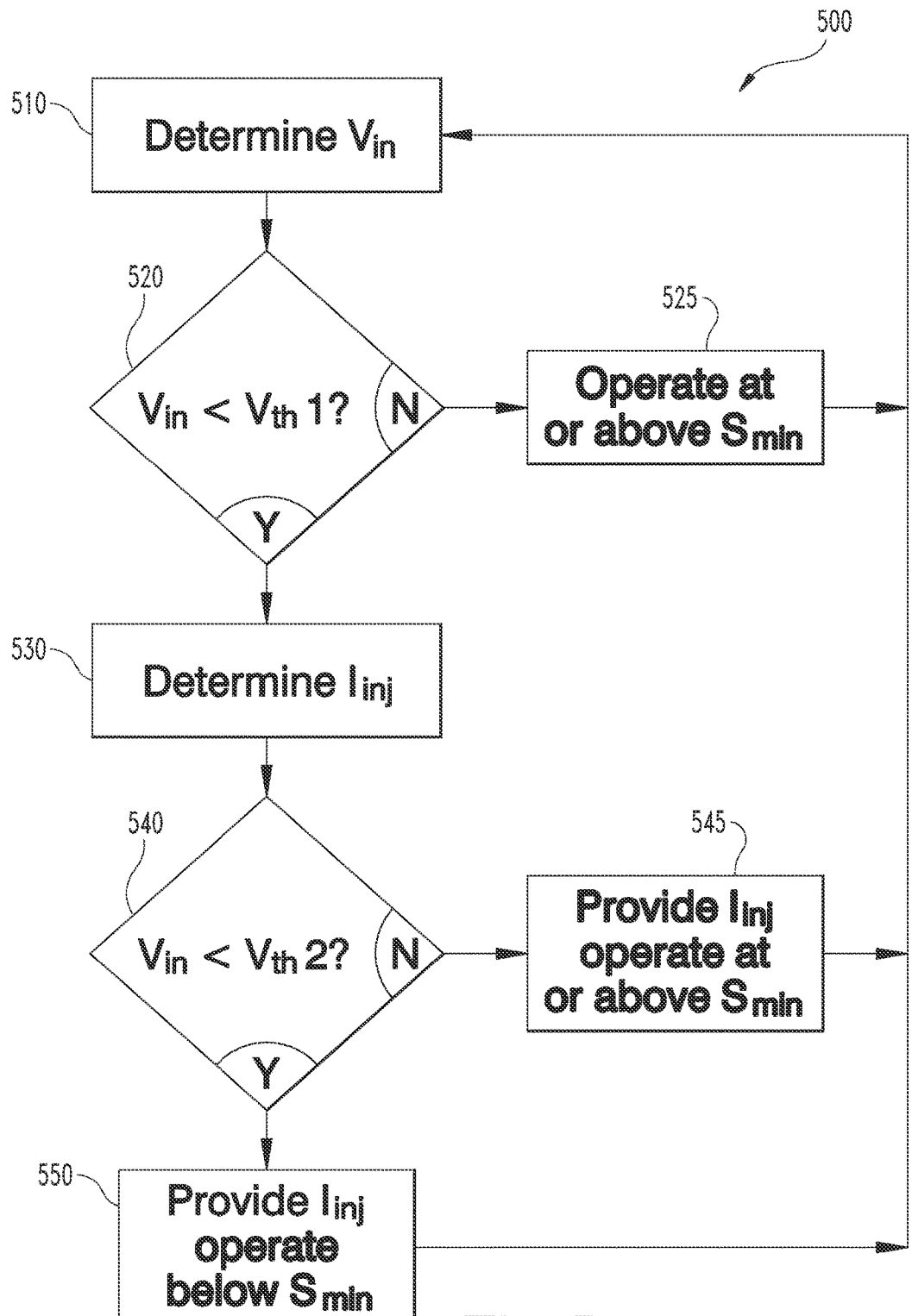
FIG. 5 is a flow diagram illustrating an exemplary controls process.

With reference to FIG. 5 there is illustrated an exemplary control process 500. Process 500 begins at operation 510 which determines a magnitude of voltage Vin. From operation 510 process 500 proceeds to conditional 520. Conditional 520 determines whether the magnitude of voltage Vin is less than magnitude of voltage Vth1 which is a threshold corresponding to an operating point below which d-axis current injection is performed, such as voltage 304, voltage 408, or voltage 418, for example. If conditional 520 determines that Vin is not less than Vth1, process 500 proceeds to operation 525 which operates the drive at or above speed Smin which corresponds to system performance and/or efficiency requirements, such as speed 302, for example. From operation 525 process 500 returns to operation 510. If conditional 520 determines that Vin is less than Vth1, process 500 proceeds to operation 530 which determines injection current Iinj. From operation 530 process 500 proceeds to conditional 540 which determines whether the magnitude of voltage Vin is less than the magnitude of voltage Vth2 which is a threshold corresponding to an operating point below which a desired speed can no longer be maintained such as voltage 308, voltage 410 or voltage 420, for example. If Vin is not less than Vth2, process 500 proceeds to operation 545 which provides injection current Iinj and operates the drive at or above speed Smin. From operation 545 process 500 returns to operation 510. If conditional 540 determines that the N is less than Vth2, process 500 proceeds to operation 550 which provides injection current Iinj and operates the drive below speed Smin. From operation 550 process 500 returns to operation 510.

It shall be understood that the exemplary embodiments summarized and described in detail above and illustrated in the figures are illustrative and not limiting or restrictive. Only the presently preferred embodiments have been shown and described and all changes and modifications that come within the scope of the invention are to be protected. It shall be appreciated that the embodiments and forms described below may be combined in certain instances and may be exclusive of one another in other instances. Likewise, it shall be appreciated that the embodiments and forms described below may or may not be combined with other aspects and features disclosed elsewhere herein. It should be understood that various features and aspects of the embodiments described above may not be necessary and embodiments lacking the same are also protected. In reading the claims, it is intended that when words such as "a," "an," "at least one,"

or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
providing a variable frequency drive configured to operate a motor to drive a refrigerant compressor using power from a power source;
commanding operation of the drive over a first operating range to provide at least a desired operating speed and minimize d-axis current, wherein over the first operating range the drive input voltage is greater than a first value in a rated voltage range;
commanding operation of the drive over a second operating range including injecting d-axis current to provide at least the desired operating speed, wherein over the second operating range the drive input voltage is lower than the first value and greater than a second value in the rated voltage range; and
commanding operation of the drive over a third operating range at a de-rated speed less than the desired operating speed, wherein over the third operating range the drive input voltage is lower than the second value.

2. A method according to claim 1 wherein the variable frequency drive comprises a rectifier electrically coupled to a DC link electrically coupled to an inverter.

3. A method according to claim 2 wherein the DC link comprises a film capacitor electrically coupled with positive and negative rails of the DC link.

4. A method according to claim 1 wherein the motor operates at full torque over the first operating range and at reduced torque over the second operating range.

5. A method according to claim 1 wherein the drive is configured to operate a motor having a back EMF constant with a magnitude less than that required to maintain the desired speed below the first value and simultaneously minimize d-axis current.

6. A method according to claim 5 wherein the motor is a surface magnet permanent magnet motor.

7. A method according to claim 1 further comprising determining or estimating voltage at a node intermediate the power source and the drive to assess the drive input voltage.

8. A method according to claim 1 further comprising determining or estimating voltage at a node intermediate a rectifier of the drive and an inverter of the drive to assess the drive input voltage.

9. A method according to claim 1 further comprising determining or estimating voltage at an output of the drive to assess the drive input voltage.

10. A system comprising:
a variable frequency drive configured to operate a motor to drive a refrigerant compressor using power from a power source electrically coupled with an input of the drive, the power source having a rated voltage range; and
a controller configured to control operation of the drive and to receive an input signal indicating a drive voltage condition;
wherein the controller is configured to:
command operation of the drive to minimize d-axis current and maintain at least a desired motor speed over a first range of the drive voltage condition in the rated voltage range,
command operation of the drive to increase d-axis current and maintain at least the desired motor speed over a second range of the drive voltage condition in the rated voltage range, the second range extending lower than the first range, and
command operation of the drive to provide a motor speed less than the desired motor speed over a third range of the drive voltage condition, the third range extending lower than the second range.

11. A system according to claim 10 wherein the drive includes a film capacitor electrically coupled intermediate positive and negative rails of a DC bus.

12. A system according to claim 10 wherein the controller is configured to vary d-axis current over the second operating range to maintain the desired motor speed.

13. A system according to claim 10 wherein the motor operates at reduced torque and reduced efficiency over the second operating range relative to the first operating range.

14. A system according to claim 10 further comprising the motor wherein the motor is configured to have a back EMF constant less than that required to maintain the desired speed while simultaneously minimizing d-axis current over the second range.

15. A system according to claim 14 further comprising a refrigeration loop including a compressor operatively coupled with the motor, a condenser, and an evaporator.

16. An apparatus comprising:
a variable frequency drive including an AC to DC converter configured to receive AC input power from a power supply and provide DC power to a DC link and an inverter configured to receive DC power from the DC link and provide a PWM output;
a permanent magnet motor including a plurality of stator windings configured to receive the PWM output, a rotor including at least one permanent magnet, and an output shaft coupled with the rotor and coupled with a refrigerant compressor; and
a controller configured to command operation of the variable frequency drive to meet or exceed a predetermined motor speed with a first d-axis current if the drive is able to provide DC link voltage above a threshold in a rated voltage range, and command operation of the variable frequency drive to meet or exceed the predetermined motor speed with a second d-axis current if the drive is not able to provide DC link voltage above the threshold, wherein the second d-axis current is greater than the first d-axis current.

17. An apparatus according to claim 16 wherein the first d-axis current is a minimized d-axis current.

18. An apparatus according to claim 16 wherein the controller is further configured to vary the magnitude of d-axis current depending upon the difference between the threshold and the DC link voltage that the drive is able to provide.

19. An apparatus according to claim 16 wherein the second d-axis current is provided using current injection.

20. An apparatus according to claim 16 further comprising a refrigeration loop including a compressor operatively coupled with the motor, a condenser, and an evaporator.

21. An apparatus according to claim 16 wherein the controller is configured to control the variable frequency drive to operate below the predetermined motor speed if the drive is not able to provide DC link voltage above a second threshold in the rated voltage range, the second threshold being less than the first threshold.

* * * * *